United States Patent
Brandl et al.

(10) Patent No.: US 8,663,022 B2
(45) Date of Patent: Mar. 4, 2014

(54) ELASTIC JOINT BODY

(75) Inventors: Marc Brandl, Burgkirchen (DE);
Wolfgang Nindel, Muehldorf (DE);
Joachim Reihle, Schnaitsee (DE);
Thomas Ochsenkuehn, Kraiburg (DE);
Josef Stubenrauch, Rott (DE); Bernd Scheper, Richertsheim (DE); Juergen Leinfelder, Waldkraiburg (DE)

(73) Assignee: SGF Sueddeutsche Gelenkscheibenfabrik GmbH & Co. KG

( * ) Notice: Subject to any disclaimer, the term of this patent is extended or adjusted under 35 U.S.C. 154(b) by 68 days.

(21) Appl. No.: 13/121,707

(22) PCT Filed: Sep. 30, 2009

(86) PCT No.: PCT/EP2009/007029
§ 371 (c)(1),
(2), (4) Date: May 11, 2011

(87) PCT Pub. No.: WO2010/037538
PCT Pub. Date: Apr. 8, 2010

(65) Prior Publication Data
US 2012/0094774 A1      Apr. 19, 2012

(30) Foreign Application Priority Data

Oct. 1, 2008 (DE) .......................... 10 2008 050 202

(51) Int. Cl.
*F16D 3/62* (2006.01)
(52) U.S. Cl.
USPC .............................................. 464/69; 464/95
(58) Field of Classification Search
USPC ................................................ 464/69, 93–96
See application file for complete search history.

(56) References Cited

U.S. PATENT DOCUMENTS 1,531,999 A    3/1925  Stokes
4,118,952 A  * 10/1978  Kobayashi ...................... 464/69

FOREIGN PATENT DOCUMENTS

| DE | 1040854 B | * | 10/1958 |
| DE | 3734089 A1 | | 6/1988 |
| DE | 4304274 C1 | | 3/1994 |
| EP | 1302686 A2 | | 4/2003 |
| EP | 1 469 218 A | | 10/2004 |
| EP | 1469218 A1 | | 10/2004 |
| JP | 2006071059 A | * | 3/2006 |

OTHER PUBLICATIONS

International Search Report for Appl. No. PCT/EP2009/007029 mailed Dec. 21, 2009.

* cited by examiner

*Primary Examiner* — Gregory Binda
*Assistant Examiner* — Josh Skroupa
(74) *Attorney, Agent, or Firm* — Carter, DeLuca, Farrell & Schmidt, LLP

(57) ABSTRACT

An elastic joint body for a shaft arrangement for the articulated connection of two shaft sections, comprising a plurality of bushes (12) disposed in circumferential direction at predetermined angular distances in relation to a center line of the joint body, a plurality of loop assemblies (22, 24, 26), wherein each loop assembly (22, 24, 26) is looped around in each case two adjacent bushes (12) and at least two loop assemblies (22, 24, 26) are looped around each bush (12), a support device (10) that is disposed for axially guiding the plurality of loop assemblies (22, 24, 26) on at least one of the bushes, and a rubber-elastic sheath, into which the loop assemblies (22, 24, 26), the support device (10) and the bushes (12) are at least partially embedded. According to the invention it is provided that the support device (10) comprises two axially outer shoulder elements (14, 16), which may be fitted on one of the bushes (12) and against which at least two of the loop assemblies (22, 24, 26) to be guided are positioned, wherein between said assembly loops (22, 24, 26) at least one axially inner intermediate disk (18, 20) is disposed on one of the bushes (12) and is disposed at an angle obliquely relative to the center line (M) of the bush (12).

20 Claims, 4 Drawing Sheets

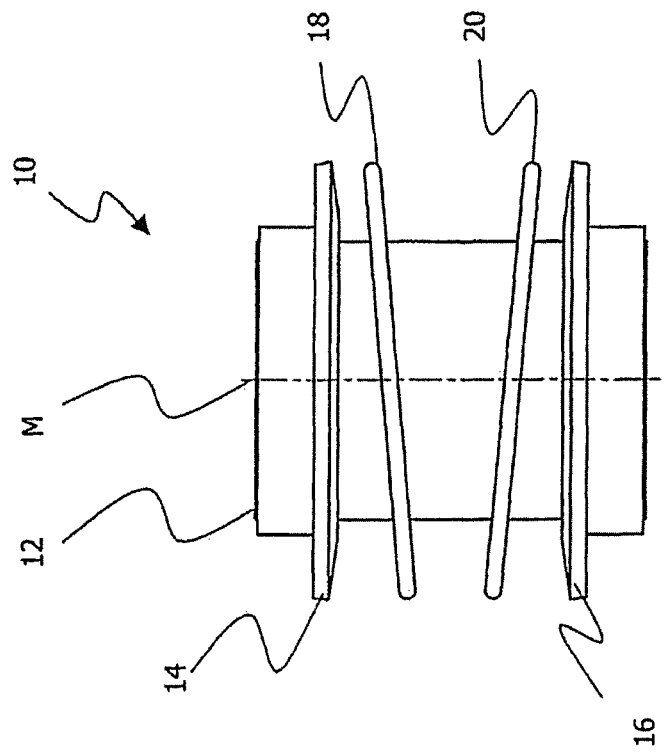
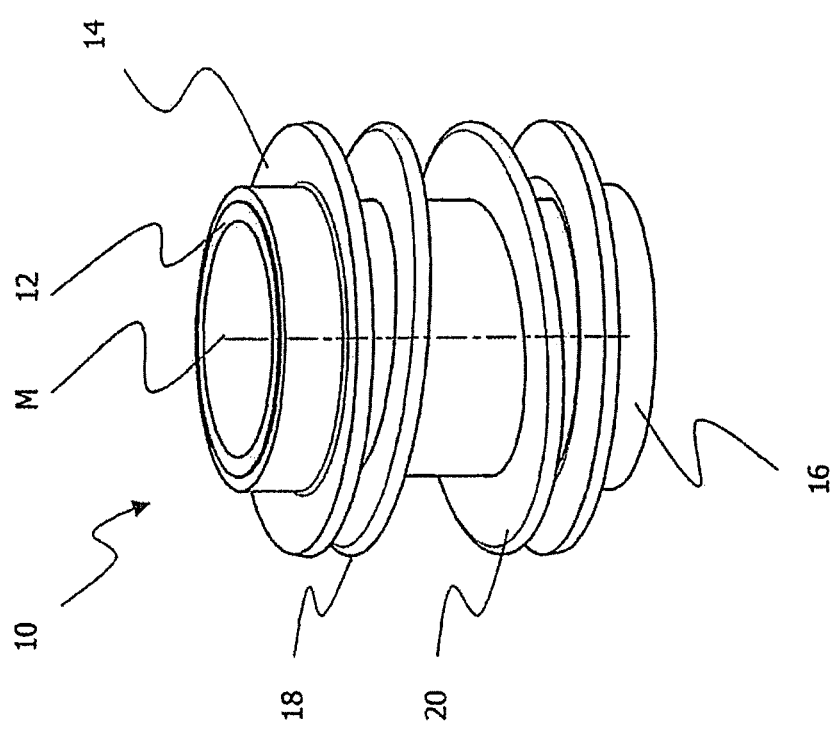
Fig.1
Fig.2

ELASTIC JOINT BODY

TECHNICAL FIELD

The present invention relates to an elastic joint body for a shaft arrangement for the articulated connection of two shaft sections, comprising a plurality of bushes disposed in circumferential direction at predetermined angular distances in relation to the centre line of the joint body, a plurality of loop assemblies, wherein each loop assembly is looped around in each case two adjacent bushes and at least two loop assemblies are looped around each bush, a support device disposed for axially guiding the plurality of loop assemblies on at least one bush, and a rubber-elastic sheath, into which the loop assemblies, the support devices and the bushes are at least partially embedded.

BACKGROUND OF RELATED ART

Such joint bodies are prior art and are disclosed for example in DE 37 34 089 A1. In the introduction to the description this document describes an elastic joint body, in which for axially supporting the loop assembles in axial direction collars are press-fitted. The collars have an L-shaped profile and as a result of being press-fitted are connected in an axially non-displaceable and rotationally fixed manner to the bush. For axially guiding and/or supporting the individual loop assemblies that are looped around the bushes, support elements are provided around the bushes. The support elements are connected in an immovable and rotationally fixed manner to the bush associated with them and extend at right angles to the centre line of the bush.

DE 1 040 854 A further discloses a joint disk, in which the thread windings are each looped around two adjacent spool-like bodies. The coaxial spool-like bodies are seated on a bush, the externally flanged edges of which hold guard plates. To prevent spreading of the cover disks of the spool bodies, these are of a curved construction. The individual thread windings are connected to one another in 3o such a way that the convex curvatures of the cover disks are directed outwards, so that the mutually adjacent cover disks of the spool bodies are curved concavely and mutually support one another at their outer edge.

As further prior art, reference is made to the documents U.S. Pat. No. 1,531,999 A, EP 1 302 686 A2 and EP 1 469 218 A1. These documents likewise disclose elastic joint bodies, in which loop assemblies are looped around bushes, although in terms of their relevance they are less significant than the previously described documents.

During the manufacture of this joint body, first the support elements are pressed onto the bushes and then the loop assemblies are wound onto the bushes. The manufacturing process for the above joint bodies of prior art is therefore relatively laborious. The support elements have to be pressed onto the bushes first before the loop assemblies may be introduced or wound into the regions between two support elements.

Currently, in the development of such joint bodies efforts are being directed also towards designing them with a view to the increasing mechanical loads resulting from the steady rise in engine outputs and towards further extending their service life.

The object of the present invention is to provide an elastic joint body of the type described in the introduction, which given the same dimensions meets the raised torque transmission requirements and at the same time enables an extension of the service life and simplifies the manufacturing process.

SUMMARY

This object is achieved by an elastic joint body of the type described in the introduction, in which the support device comprises two axially outer shoulder elements, which may be fitted on one of the bushes and against which at least two of the loop assemblies to be guided are positioned, wherein between these loop assemblies at least one axially inner, substantially planar intermediate disk is provided on one of the bushes and is disposed at an angle obliquely relative to the centre line of the bush.

Through the use in the elastic joint body according to the invention of a support device comprising at least one axially inner intermediate disk that is disposed—in relation to its extent plane—at an angle obliquely relative to the centre line of the bush, in the runout region of the loop assemblies from the bush an intensified compression of the loop assemblies occurs, with the result that the loop assemblies are able to take up higher loads and consequently the service life of the joint body may be extended. By runout region in this context is meant the region, in which the loop assemblies run from the one bush in the direction of the next bush, around which they are looped.

As a result of the improved stability under load of the thread assemblies, given the same dimensions on the whole greater torques may be transmitted. Equally, given the same torque absorption the elastic joint body may be constructed with smaller dimensions. With the elastic joint body according to the invention it is therefore possible to save installation space in a drive train of a motor vehicle. Furthermore, by means of the intermediate disks disposed obliquely on the bushes of the joint body according to the invention the differently loaded loop assemblies of tension section and compression section may be effectively separated from one another, with the result that frictional effects between the loop assemblies of identical materials may be avoided.

By virtue of the elastic joint body according to the invention the manufacturing process may be made markedly simpler and faster than the manufacturing process of the joint body of prior art because the step of pressing the inner support elements onto the bushes no longer applies in the joint body according to the invention. Rather, the intermediate disks are mounted with clearance onto the respective bush and automatically align themselves in an optimum oblique position during the manufacturing process. A purposeful positioning in a setpoint position during the encapsulation with elastomer is not necessary. Nor is there any need for arrangements, such as for example collars, to be provided on the intermediate disks for positioning purposes.

According to a preferred form of implementation of the invention it is provided that the at least one intermediate disk is disposed with such a clearance on the bush that it assumes on the bush an angle, by which it is inclined relative to the axis of one of the bushes. In this connection, in a constructional variant of the invention it may be provided that the radial clearance between a central opening of the intermediate disk and the outer circumferential surface of the associated bush is in the region of 0.01 mm to 1.5 mm, in particular 0.05 mm to 0.1 mm. By virtue of the clearance between the intermediate disk and the bush the intermediate disks are disposed as it were "floating" on the bush. The intermediate disks are therefore to a certain extent able to adapt and/or freely adjust to various factors, such as for example material hardness of the loop assemblies and the number of thread windings of the individual loop assemblies, in the course of manufacture.

The clearance between the bush and the at least one intermediate disk disposed on this bush is for example designed according to the invention in such a way that the intermediate disks prior to vulcanization position themselves ideally obliquely relative to the centre line of the associated bush. The inclination of the intermediate disks between the individual loop assemblies is fixed by elastomer during vulcanization and is therefore permanently maintained throughout the service life of the joint body according to the invention, wherein displacements of the elastomer for example in the event of cardanic stressing of the joint body are simultaneously carried out. As already mentioned, the inclination of the intermediate disks leads in sections to an intensified compressing of the loop assemblies. Because of this continuous compressing of the loop assemblies in the runout region of the loop assemblies from the bushes, i.e. where the loop assemblies run out in the direction of the next bush, around which they are to be looped, a self-optimizing support effect arises. This means that precisely this region of the loop assemblies that is highly loaded in the event of cardanic stresses is strengthened by the increased compression of the loop assemblies. By virtue of this support effect the unit load of the individual thread windings of the loop assemblies may be harmonized.

As an alternative to the previously described form of implementation having a clearance between the intermediate disk and the associated bush, according to a development of the invention it may be provided that the at least one intermediate disk is formed integrally with the associated bush, wherein the intermediate disk lies at an angle obliquely relative to the centre line of the bush. In this way too, the desired support effects may be achieved in the runout region of the loop assemblies.

According to a form of implementation of the invention, three loop assemblies are looped around each bush, wherein associated with a central loop assembly are two axially inner intermediate disks, which are disposed at an angle obliquely relative to the centre line of the bush, and wherein between the axially inner intermediate disks and the axially outer shoulder elements two loop assemblies are provided. The two intermediate disks are also disposed at an acute angle to one another, i.e. they do not extend parallel to one another. In a preferred manner it is provided that during operation of the elastic joint body the loop assembly between the two axially inner intermediate disks is subject to tensile loading, whereas the two axially outer loop assemblies between the axially inner intermediate disks and the axially outer shoulder elements are subject to compression loading.

This form of implementation of the invention provides that the axially inner intermediate disks extend at such an angle to the axis of the associated bush that in the runout region of the outer loop assemblies they approach one another and the respective one of the axially outer shoulder elements that is nearest to them. In this case, it may be provided that the axially inner intermediate disks in the circumferential region of the bush associated with them continuously reduce the cross section of the axially outer loop assemblies and of the central loop assembly in the direction of the next bush, around which the respective loop assembly is looped. In other words, the axially outer loop assemblies subject to compression loading are continuously compressed by the axially outer shoulder elements and the axially inner intermediate disks in the direction of their respective runout region, whereas the central loop assembly subject to tensile loading is continuously compressed in the runout region by the two axially inner intermediate disks. Thus, the greatest compression of the loop assemblies lies in each case at the outer edge portion of the intermediate disks.

In order as far as possible to avoid an undesirable deformation of the intermediate disks during the manufacturing process or during operation of the elastic joint body, a development of the invention provides that the intermediate disks are of a flexurally stiff construction. This may be achieved by a suitable choice of material and dimensions.

According to the invention it may be provided that the axially outer shoulder elements are connected to one of the bushes in a fixed manner, in particular by press fitting. In this connection, it may further be provided that the axially outer shoulder elements may be collar-shaped, U-shaped, L-shaped or a disk-shaped.

The invention further relates to a shaft arrangement having a previously described elastic joint body.

BRIEF DESCRIPTION OF THE DRAWINGS

The invention is described below by way of example with reference to the accompanying figures. These show:

FIG. 1 is a perspective view of a bush with a support device according to the invention;

FIG. 2 is a front view of a bush with a support device according to the invention;

DETAILED DESCRIPTION

FIG. 1 shows a perspective view of the support device 10. The support device 10 is disposed on a bush 12 and comprises two axially outer shoulder elements 14, 16 and two axially inner intermediate disks 18, 20. The outer shoulder elements 14, 16 are mounted onto the bush 12 in a fixed manner by means of an interference fit. It is further evident from FIG. 1 that the intermediate disks 18, 20 extend obliquely relative to the centre line M of the bush 12 associated with them.

FIG. 2 shows a front view of the support device 10, in which the outer shoulder elements 14, 16 and the obliquely positioned, axially inner intermediate disks 18, 20 may be seen once more. The axially inner intermediate disks 18, 20 are disposed at such an inclination relative to the centre line M of the bush 12 that they, on the one hand, in sections approach one another and, on the other hand, at their opposite portion approach the respective one of the axially outer shoulder elements 14, 16 that is nearest to them.

In this respect it should be mentioned that the intermediate disks 18, 20 are constructed with a central opening, through which the bush 12 extends. The central opening is larger than the outside diameter of the bush 12. Optionally the central opening may alternatively be elliptical. As a result, a clearance is provided between the intermediate disks 18, 20 and the associated bush 12, so that the intermediate disks 18, 20 during the manufacturing process of a joint body position themselves obliquely relative to the centre line M of the bush 12.

As an alternative to the clearance between the bush 12 and the intermediate disks 18, 20, the obliquely positioned intermediate disks 18, 20 may however be formed integrally with the bush 12.

Figure 3A:
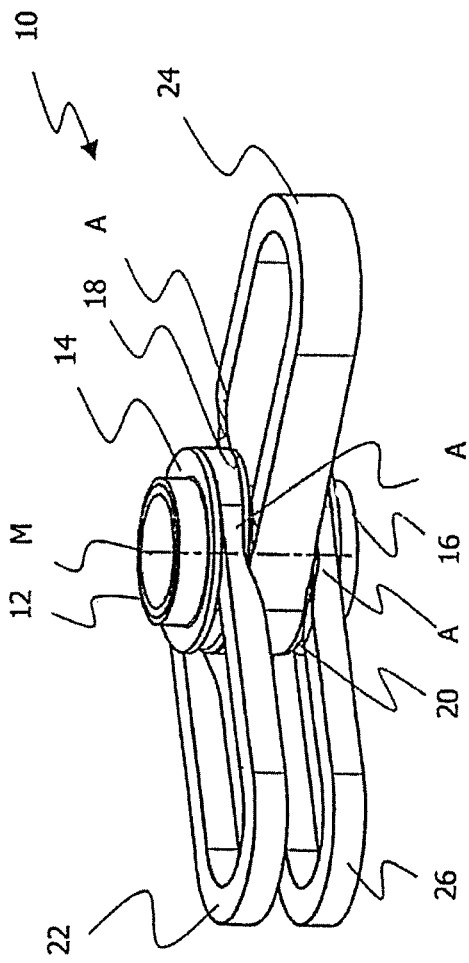
FIG. 3a, 3b are perspective views of a bush with the support device according to the invention and the loop assemblies supported thereby.
Figure 3B:
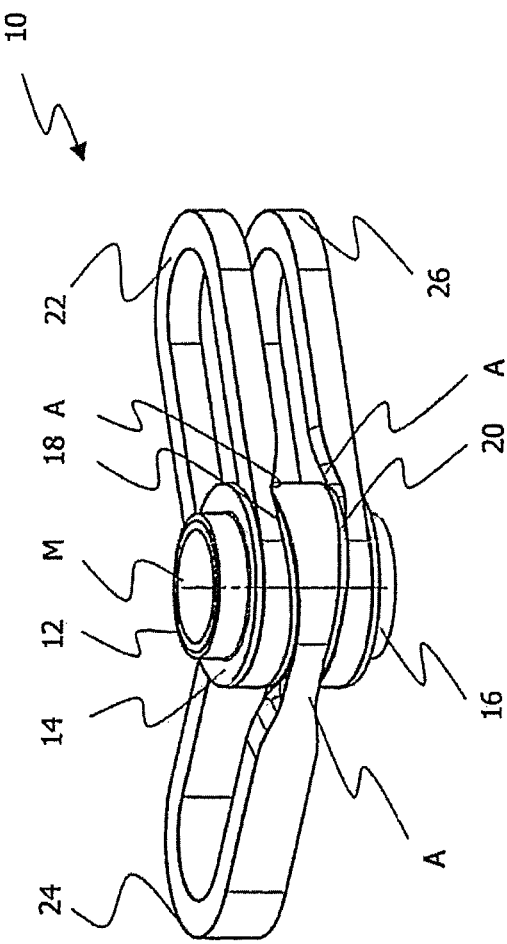

FIGS. 3a and 3b show perspective views of the support device 10 with the loop assemblies 22, 24 and 26 that are guided and/or supported by the support device 10.

FIGS. 3a and 3b show that the outer loop assemblies 22 and 26, which are subject to axial loading, are guided between the axially outer shoulder elements 14, 16 and the intermediate disks 18, 20, i.e. the loop assembly 22 is guided between the outer shoulder element 14 and the intermediate disk 18 and the loop assembly 26 is guided between the shoulder element 16 and the intermediate disk 20. In contrast thereto, the central loop assembly 24; which is subject to tensile loading, is guided by the two intermediate disks 18, 20 that extend obliquely relative to the centre line M of the bush 12. The intermediate disks 18, 20 prevent the loop assemblies from rubbing against one another.

It is further evident from FIGS. 3a and 3b how the axially inner intermediate disks 18, 20 in sections compress the loop assemblies 22, 24, 26, i.e. continuously reduce the cross section of the loop assemblies 22, 24, 26 in the runout region A from the bush 12 in the direction of the next bush (not shown), around which the loop assemblies 22, 24, 26 are looped. As already mentioned, by the runout region A in this context is meant the region, in which the loop assemblies extend away from the one bush in the direction of the next bush, around which they are looped.

The greatest compression of the loop assemblies 22, 24, 26 therefore lies in each case at the outer radius of the intermediate disks 18, 20. In other words, the intermediate disks 18, 20 in interaction with the outer shoulder elements 14, 16 reduce the cross section of the outer loop assemblies 22, 26, which are subject to compression loading, in the direction of the runout region, whereas the cross section of the loop assembly 24, which is subject to tensile loading, is defined only by the inclination of the intermediate disks 18, 20.

As already described above, the intermediate disks 18, 20 and the bushes 12 are designed with such a clearance relative to one another that during manufacture of the joint body, i.e. during the positioning of the loop assemblies 22, 24, 26, they position themselves prior to vulcanization obliquely relative to the centre line M of the bushes 12. In other words, during manufacture first the loop assembly 24 and then the two intermediate disks 18, 20 are slipped onto the bush 12, whereupon the intermediate disks 18, 20 position themselves obliquely as a result of the clearance. Because of the clearance between the intermediate disk 18, 20 and the bush 12 the intermediate disks are movable on the bush, with the result that the intermediate disks 18, 20 are able to a certain extent to adapt and/or freely adjust appropriately to various factors, such as for example material hardness of the loop assemblies and the number of thread windings of the individual loop assemblies. The loop assemblies 22, 26 are then slipped onto the bush 12. During the vulcanization that follows, the inclination of the intermediate disks 18, 20 is permanently fixed by the elastomer compound, i.e. is "frozen" in the elastomer compound.

The loop assemblies 22, 24, 26 therefore experience a continuous compression, evident from FIGS. 3a and 3b, in the runout region A of the bush 12, i.e. in the direction of the next bush, around which the respective loop assembly 22, 24, 26 is looped. Because of this continuous compression of the loop assemblies 22, 24, 26 in the region, in which the loop assemblies 22, 24, 26 run out in the direction of the next bush 12, around which they are looped, a self-optimizing support effect arises. This means that precisely this region of the loop assemblies 22, 24, 26 that is highly loaded in the event of cardanic stresses is strengthened by the increased compression of the loop assemblies. This support effect makes it possible to harmonize the unit load of the individual thread windings of the loop assemblies 22, 24, 26. In other words, the region, in which the loop assemblies 22, 24, 26 have to take up the greatest forces, is strengthened the most by the compression of the loop assemblies 22, 24, 26. Furthermore, as a result of the loop assemblies 22, 24, 26 being compressed in sections by means of the intermediate disks 18, 20 it is possible to use loop assemblies 22, 24, 26 having a larger number of thread windings, with the result that the service life and the torque absorption of the joint body may be increased.

Figure 4:
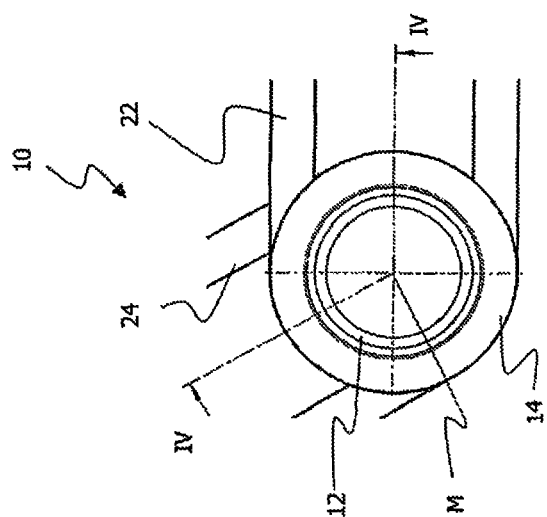
FIG. 4 is a plan view of a bush with the support device.

FIG. 4 shows a plan view of the support device 10 with the bush 12, the outer shoulder element 14 as well as the loop assembly 22 that is subject to compression loading and the loop assembly 24 that is subject to tensile loading.

Figure 5:
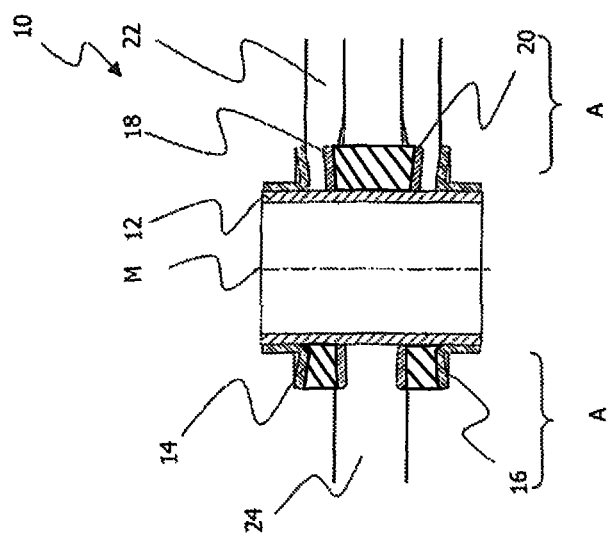
FIG. 5 is a sectional view of the support device along the section line IV-IV of FIG. 4.

FIG. 5 is a sectional view along the section line IV-IV of FIG. 4. The bush 12 with the outer shoulder elements 14, 16 as well as the intermediate disks 18, 20 are evident once more. It is further clearly evident that the central loop assembly 24 that is subject to tensile loading experiences a continuous reduction of the cross section as a result of the intermediate disks 18, 20. The greatest compression of the cross section of the loop assembly 24 lies in the runout region A of the loop assembly 24 at the outer radius of the intermediate disks 18, 20.

It is further evident from FIG. 5 that the axially outer loop assemblies 22, 26 that are subject to compression loading are compressed between the obliquely positioned intermediate disks 18, 20 and the outer shoulder elements 14, 16. The greatest compression is likewise in the runout region A of the loop assemblies 22, 26 at the outer radius of the intermediate disks 18, 20.

FIG. 5 moreover shows that the intermediate disks 18, 20 separate the differently loaded loop assemblies 22, 24, 26 from one another and that frictional effects between the loop assemblies 22, 24, 26 made of identical materials are avoided.

Figure 6:
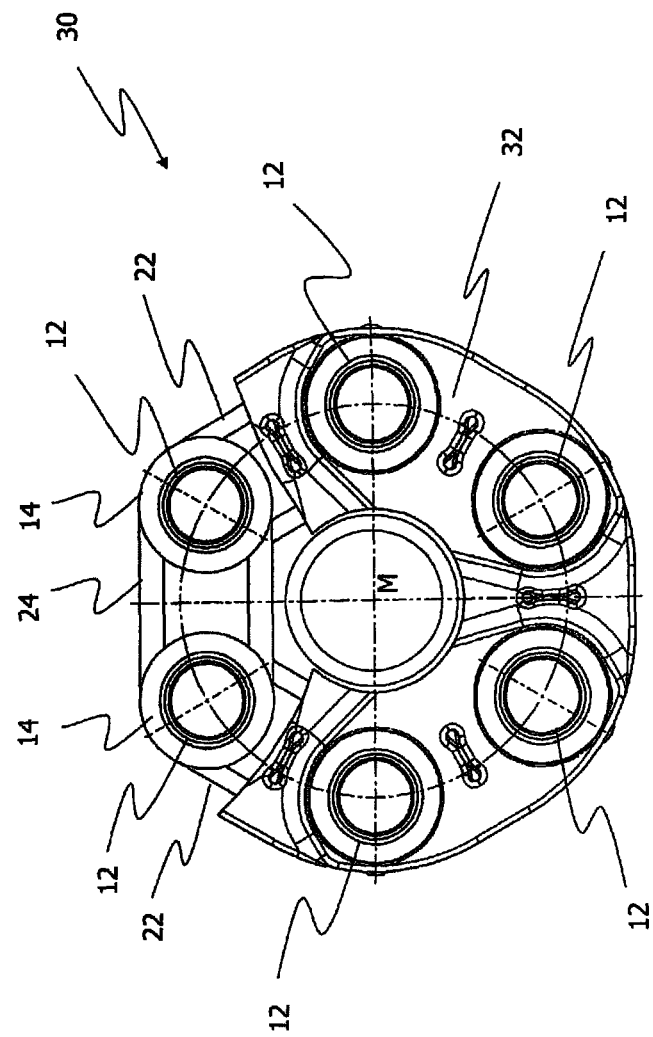
FIG. 6 is a partially cut-open plan view of a joint body according to the present invention.

FIG. 6 shows a partially broken-open plan view of an elastic joint body 30 according to the invention comprising six bushes 12, which are surrounded by a rubber-elastic sheath 32. The bushes 12 are disposed in circumferential direction at predetermined angular distances of the joint body 30 in relation to a centre line M. In the region of the joint body 30 according to FIG. 6 that is represented in a cut-open manner in the drawing the shoulder elements 14 on the bushes 12 may be seen, which are disposed for axially supporting the loop assemblies 22.

From FIG. 6 it is moreover evident that a plurality of loop assemblies 22, 24 and 26 are looped around each individual bush 12 (see FIGS. 3a, 3b). In this case, it may be provided that the loop assembly 24, in the fitted state of the joint body 30 in a shaft arrangement, is loaded by a tensile force, while the loop assemblies 22 and 26 are each subject to compression and/or axial loading.

What is claimed is:

1. Elastic joint body for a shaft arrangement for the articulated connection of two shaft sections, comprising:
a plurality of bushes disposed in a circumferential direction at predetermined angular distances in relation to a centre line of the joint body,
a plurality of loop assemblies, wherein each loop assembly is looped around in each case two adjacent bushes and at least two loop assemblies are looped around each bush,
a support device, which is disposed for axially guiding the plurality of loop assemblies on at least one bushand,
a rubber-elastic sheath, into which the loop assemblies, the support devices and the bushes are at least partially embedded, wherein the support device comprises two axially outer shoulder elements, which may be fitted on one of the bushes and against which at least two of the loop assemblies to be guided are positioned, wherein between said assembly loops at least one axially inner intermediate disk is provided on one of the bushes and is disposed at an angle obliquely relative to the centre line of the bush, wherein the at least one axially inner intermediate disk is in contact with at least two loop assemblies.

2. Joint body according to claim 1, wherein the at least one intermediate disk is disposed with such a clearance on the bush that it assumes on the bush an angle, by which it is inclined relative to the axis of one of the bushes.

3. Joint body according to claim 2, wherein the radial clearance between the at least one intermediate disk and the associated bush is in the region of 0.01 mm to 1.5 mm, in particular of 0.05 mm to 0.1 mm.

4. Joint body according to claim 1, wherein the at least one intermediate disk is formed integrally with the associated bush, wherein the intermediate disk lies at an angle obliquely relative to the centre line of the bush.

5. Joint body according to claim 1, wherein three loop assemblies are looped around each bush, wherein associated with a central loop assembly are two axially inner intermediate disks, which are disposed at an angle obliquely relative to the centre line of the bush, and wherein between the axially inner intermediate disks and the axially outer shoulder elements two loop assemblies are provided.

6. Joint body according to claim 5, wherein the axially inner intermediate disks extend at such an angle relative to the centre line of the associated bush that they approach one another and the respective one of the axially outer shoulder elements that is nearest to them.

7. Joint body according to claim 5, wherein the axially inner intermediate disks in the circumferential region of the bush associated with them continuously reduce the cross section of the axially outer loop assemblies and of the central loop assembly in the direction of the next bush, around which the respective loop assembly is looped.

8. Joint body according to claim 1, wherein the intermediate disks are of a flexurally stiff construction.

9. Joint body according to claim 1, wherein the axially outer shoulder elements are connected to one of the bushes in a fixed manner, in particular by press-fitting.

10. Joint body according to claim 1, wherein the axially outer shoulder elements are collar-shaped, U-shaped, L-shaped or disk-shaped.

11. Shaft arrangement having an elastic joint body according to claim 1.

12. Elastic joint body for a shaft arrangement for the articulated connection of two shaft sections, comprising:
a plurality of bushes disposed in a circumferential direction at predetermined angular distances in relation to a centre line of the joint body,
a plurality of loop assemblies, wherein each loop assembly is looped around in each case two adjacent bushes and at least two loop assemblies are looped around each bush,
a support device, which is disposed for axially guiding the plurality of loop assemblies on at least one bushand,
a rubber-elastic sheath, into which the loop assemblies, the support devices and the bushes are at least partially embedded,
wherein the support device comprises two axially outer shoulder elements, which may be fitted on one of the bushes and against which at least two of the loop assemblies to be guided are positioned, wherein between said assembly loops at least one axially inner intermediate disk is provided on one of the bushes and is disposed at an angle obliquely relative to the centre line of the bush, wherein three loop assemblies are looped around each bush, wherein associated with a central loop assembly are two axially inner intermediate disks, which are disposed at an angle obliquely relative to the centre line of the bush, and wherein between the axially inner intermediate disks and the axially outer shoulder elements two loop assemblies are provided.

13. Joint body according to claim 12, wherein the at least one intermediate disk is disposed with such a clearance on the bush that it assumes on the bush an angle, by which it is inclined relative to the axis of one of the bushes.

14. Joint body according to claim 13, wherein the radial clearance between the at least one intermediate disk and the associated bush is in the region of 0.01 mm to 1.5 mm, in particular of 0.05 mm to 0.1 mm.

15. Joint body according to claim 12, wherein the at least one intermediate disk is formed integrally with the associated bush, wherein the intermediate disk lies at an angle obliquely relative to the centre line of the bush.

16. Joint body according to claim 12, wherein the axially inner intermediate disks extend at such an angle relative to the centre line of the associated bush that they approach one another and the respective one of the axially outer shoulder elements that is nearest to them.

17. Joint body according to claim 12, wherein the axially inner intermediate disks in the circumferential region of the bush associated with them continuously reduce the cross section of the axially outer loop assemblies and of the central loop assembly in the direction of the next bush, around which the respective loop assembly is looped.

18. Joint body according to claim 12, wherein the intermediate disks are of a flexurally stiff construction.

19. Joint body according to claim 12, wherein the axially outer shoulder elements are connected to one of the bushes in a fixed manner, in particular by press-fitting.

20. Joint body according to claim 12, wherein the axially outer shoulder elements are collar-shaped, U-shaped, L-shaped or disk-shaped.

* * * * *